(12) United States Patent
Arinobu et al.

(10) Patent No.: US 9,092,261 B2
(45) Date of Patent: Jul. 28, 2015

(54) IMAGE FORMING SYSTEM FOR MANAGING LOGS

(71) Applicant: KYOCERA Document Solutions Inc., Osaka (JP)

(72) Inventors: Ryota Arinobu, Osaka (JP); Keiji Okamura, Osaka (JP); Junpei Takagi, Osaka (JP); Rie Matsumoto, Osaka (JP); Masaki Kikuchi, Osaka (JP); Toru Yasui, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/292,184

(22) Filed: May 30, 2014

(65) Prior Publication Data

US 2014/0359630 A1 Dec. 4, 2014

(30) Foreign Application Priority Data

May 31, 2013 (JP) .................................. 2013-116490

(51) Int. Cl.
*G06F 3/12* (2006.01)
*G06F 9/48* (2006.01)

(52) U.S. Cl.
CPC .................................... *G06F 9/4881* (2013.01)

(58) Field of Classification Search
CPC .......................... H04N 1/00517; G06F 9/4881
USPC ................................ 358/1.1–3.29; 399/10, 81
See application file for complete search history.

(56) References Cited

U.S. PATENT DOCUMENTS

2010/0177344 A1* 7/2010 Matsumoto .................. 358/1.15

FOREIGN PATENT DOCUMENTS

| JP | 2007-323593 A | 12/2007 |
| JP | 2010-161714 A | 7/2010 |

* cited by examiner

*Primary Examiner* — Marcellus Augustin
(74) *Attorney, Agent, or Firm* — McDonnell Boehnen Hulbert & Berghoff LLP

(57) ABSTRACT

An image forming system includes a log management unit and an operation state image generation unit. The log management unit manages a job log indicating a history of a job executed by an image forming apparatus, a log image indicating a history of an output image serving as an output target of the image forming apparatus for the job, and an operation log indicating a history of an operation input to an operation unit in the image forming apparatus for the job. The operation state image generation unit generates an operation state image indicating which of a plurality of operable items in the operation unit is operated in an operation included in the operation log.

16 Claims, 10 Drawing Sheets

IMAGE FORMING SYSTEM FOR MANAGING LOGS

REFERENCE TO RELATED APPLICATIONS

This application is based upon and claims the benefit of priority from the corresponding Japanese Patent Application No. 2013-116490, filed in the Japan Patent Office on May 31, 2013, the entire contents of which are incorporated herein by reference.

FIELD

The present disclosure relates to an image forming system capable of managing logs.

BACKGROUND

A typical image forming system manages a job log indicating a history of a job executed by an image forming apparatus, and a log image indicating a history of an output image serving as an output target of the image forming apparatus for the job. By confirming the log image, an administrator is able to determine a probability that an information leak, based on an image output by a typical image forming apparatus, has occurred.

The typical image forming apparatus manages a job log, and an operation log indicating a history of an operation input to an operation unit in the image forming apparatus for a particular job.

SUMMARY

An image forming system according to an embodiment of the present disclosure includes a log management unit and an operation state image generation unit. The log management unit is configured to manage each of the following: (a) a job log indicating a history of a job executed by an image forming apparatus, (b) a log image indicating a history of an output image serving as an output target of the image forming apparatus of the job, and (c) an operation log indicating a history of an operation input to an operation unit in the image forming apparatus for the job. The operation state image generation unit is configured to generate an operation state image indicating which of a plurality of operable items in the operation unit is operated in an operation included in the operation log.

A log management method according to an embodiment of the present disclosure includes (i) managing, via a log management unit, each of the following: (a) a job log indicating a history of a job executed by an image forming apparatus, (b) a log image indicating a history of an output image serving as an output target of the image forming apparatus for the job, and (c) an operation log indicating a history of an operation input to an operation unit in the image forming apparatus for the job, and (ii) generating, via an operation state image generation unit, an operation state image indicating which of a plurality of operable items in the operation unit is operated in an operation included in the operation log.

A non-transitory computer-readable recording medium according to an embodiment of the present disclosure stores a log management program executable by a computer in an image forming apparatus. The log management program includes first and second program codes. The first program code causes the computer to manage each of the following: (a) a job log indicating a history of an executed job, (b) a log image indicating a history of an output image serving as an output target in the job, and (c) an operation log indicating a history of an operation input to an operation unit in the image forming apparatus for the job. The second program code causes the computer to generate an operation state image indicating which of a plurality of operable items in the operation unit is operated in an operation included in the operation log.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Hereinafter, an embodiment of the present disclosure will be described using drawings.

First, the configuration of an image forming system according to the embodiment will be described.

Figure 1:
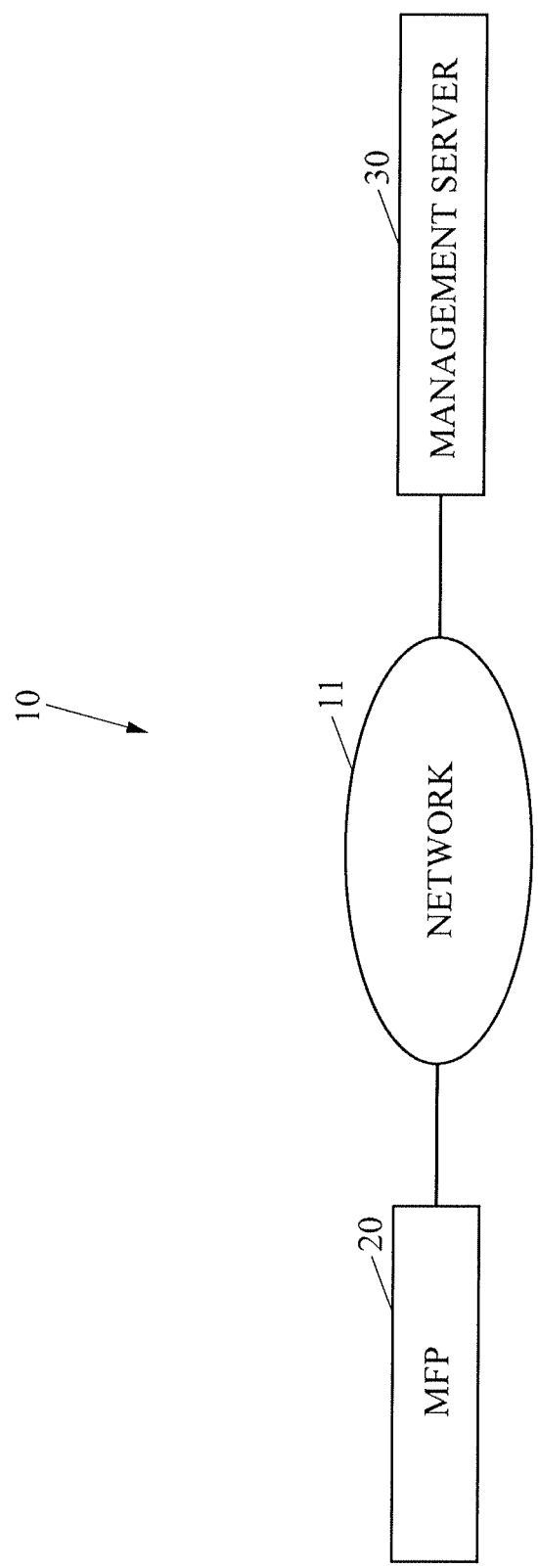
FIG. 1 illustrates a configuration of an image forming system according to an embodiment of the present disclosure.

FIG. 1 illustrates the configuration of the image forming system according to the embodiment.

As illustrated in FIG. 1, an image forming system 10 includes a multifunction peripheral (MFP) 20 serving as an image forming apparatus, and a management server 30 that is a computer such as a personal computer (PC) and manages the MFP 20. The MFP 20 and the management server 30 are connected through a network 11 such as a local area network (LAN) or Internet so as to be able to communicate with each other.

Figure 2:
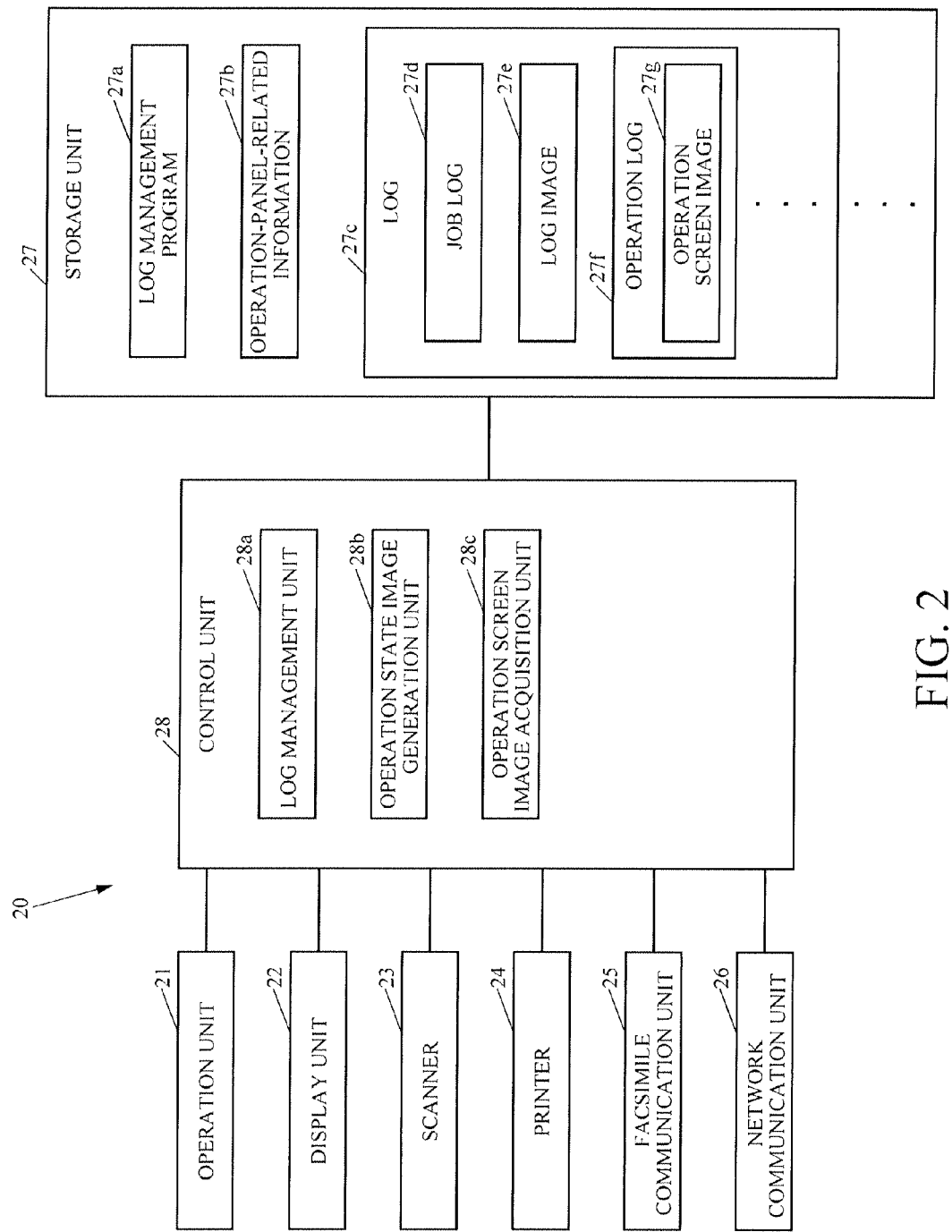
FIG. 2 illustrates a configuration of an MFP in FIG. 1.

FIG. 2 illustrates the configuration of the MFP 20 in FIG. 1.

As illustrated in FIG. 2, the MFP 20 includes an operation unit 21, a display unit 22, a scanner 23, a printer 24, a facsimile communication unit 25, a network communication unit 26, a storage unit 27, and a control unit 28. The operation unit 21 is an input device such as an input button, through which various operations are input by a user. The display unit 22 is a device such as a liquid crystal display (LCD) that displays various kinds of information. The scanner 23 is a device that reads an image from a document. The printer 24 is a device that executes printing on a recording medium such as paper. The facsimile communication unit 25 is a device that performs facsimile communication with an external facsimile apparatus, not illustrated, through a communication line such as a public telephone line. The network communication unit 26 is a device that performs communication with an external apparatus through the network 11 (see FIG. 1). The storage unit 27 is a non-volatile memory such as an electrically erasable programmable read only memory (EEPROM) or a hard disk drive (HDD) and stores therein various kinds of data. The control unit 28 is a processor that controls the entire MFP 20.

Figure 3:
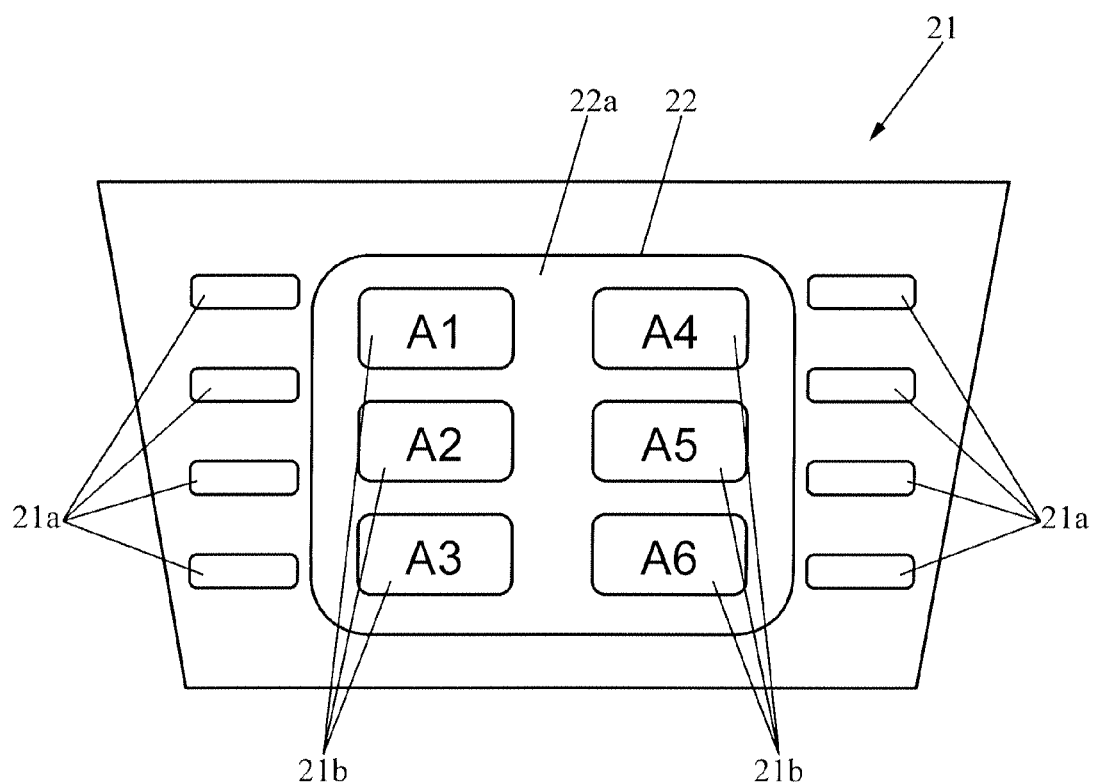
FIG. 3 illustrates an operation panel of the MFP in FIG. 2.

FIG. 3 illustrates an operation panel of the MFP 20 in FIG. 2.

As illustrated in FIG. 3, the operation panel of the MFP 20 includes an operation unit 21 and a display unit 22. The operation unit 21 includes an input device that, along with the display unit 22, forms a touch panel.

The operation unit 21 includes a plurality of hard keys 21a formed as hardware. Each of the hard keys 21a is an operable item able to be operated in the operation unit 21.

The display unit 22 illustrated in FIG. 3 displays an operation screen 22a serving as an operation target of the operation unit 21. The operation unit 21 includes soft keys 21b displayed on the operation screen 22a in the display unit 22 by software. Conditions such as the number, sizes, and arrangement of the soft keys 21b are able to be changed by software. Each of the soft keys 21b is an operable item able to be operated in the operation unit 21.

As illustrated in FIG. 2, the storage unit 27 stores therein a log management program 27a for managing a log. The log management program 27a may be installed in the MFP 20 in the manufacturing stage of the MFP 20. Alternatively, the log management program 27a may be installed in the MFP 20 from a storage medium such as a universal serial bus (USB) memory or a SD card. Alternatively, the log management program 27a may be installed in the MFP 20 from the network 11.

Figure 4:
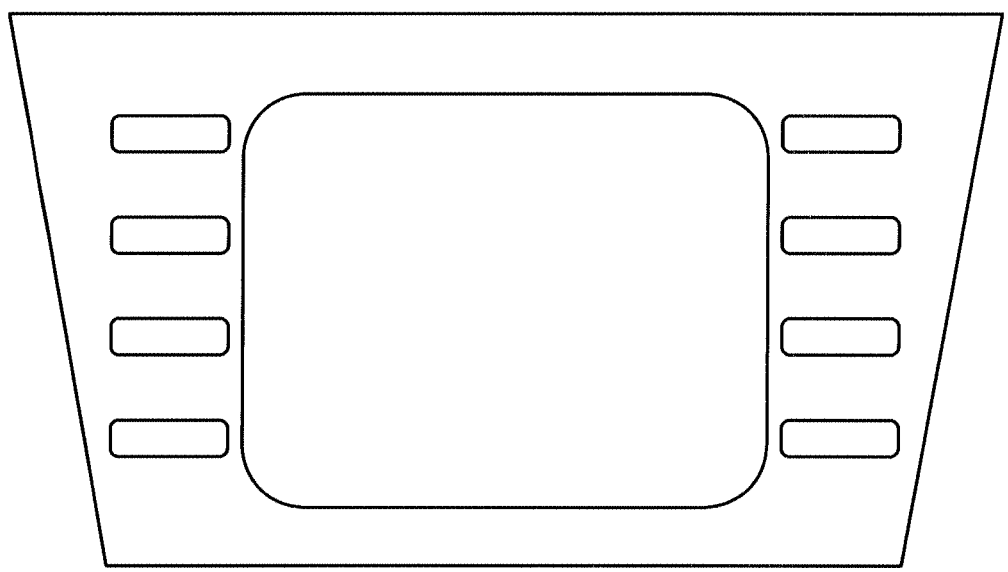
FIG. 4 illustrates an example of an image of the operation panel, included in operation-panel-related information in FIG. 2.

In addition, the storage unit 27 stores therein an image expressing such an operation panel as that illustrated in FIG. 4, and operation-panel-related information 27b serving as information including the names of individual hard keys in that image.

In addition, the storage unit 27 stores therein a log 27c for each job. The log 27c includes a job log 27d, a log image 27e, and an operation log 27f. The job log 27d indicates a history of a job executed by the MFP 20. The log image 27e indicates a history of an output image serving as an output target of the MFP 20 for the job. The operation log 27f indicates a history of an operation input to the operation unit 21 for the job, and is stored for each operation. The operation log 27f includes an operation screen image 27g serving as an image of the operation screen 22a (see FIG. 2).

The control unit 28 includes, for example, a central processing unit (CPU), a read only memory (ROM) storing therein a program and various kinds of data, and a random access memory (RAM) used as a working area of the CPU. The CPU executes the program stored in the ROM or the storage unit 27.

By executing the log management program 27a stored in the storage unit 27, the control unit 28 functions as a log management unit 28a, an operation state image generation unit 28b, and an operation screen image acquisition unit 28c. The log management unit 28a manages the log 27c. The operation state image generation unit 28b generates an operation state image indicating which key out of the plurality of hard keys 21a and the plurality of soft keys 21b in the operation unit 21 is operated in an operation included in the operation log 27f. The operation screen image acquisition unit 28c acquires the operation screen image 27g when the operation unit 21 is operated.

Figure 5:
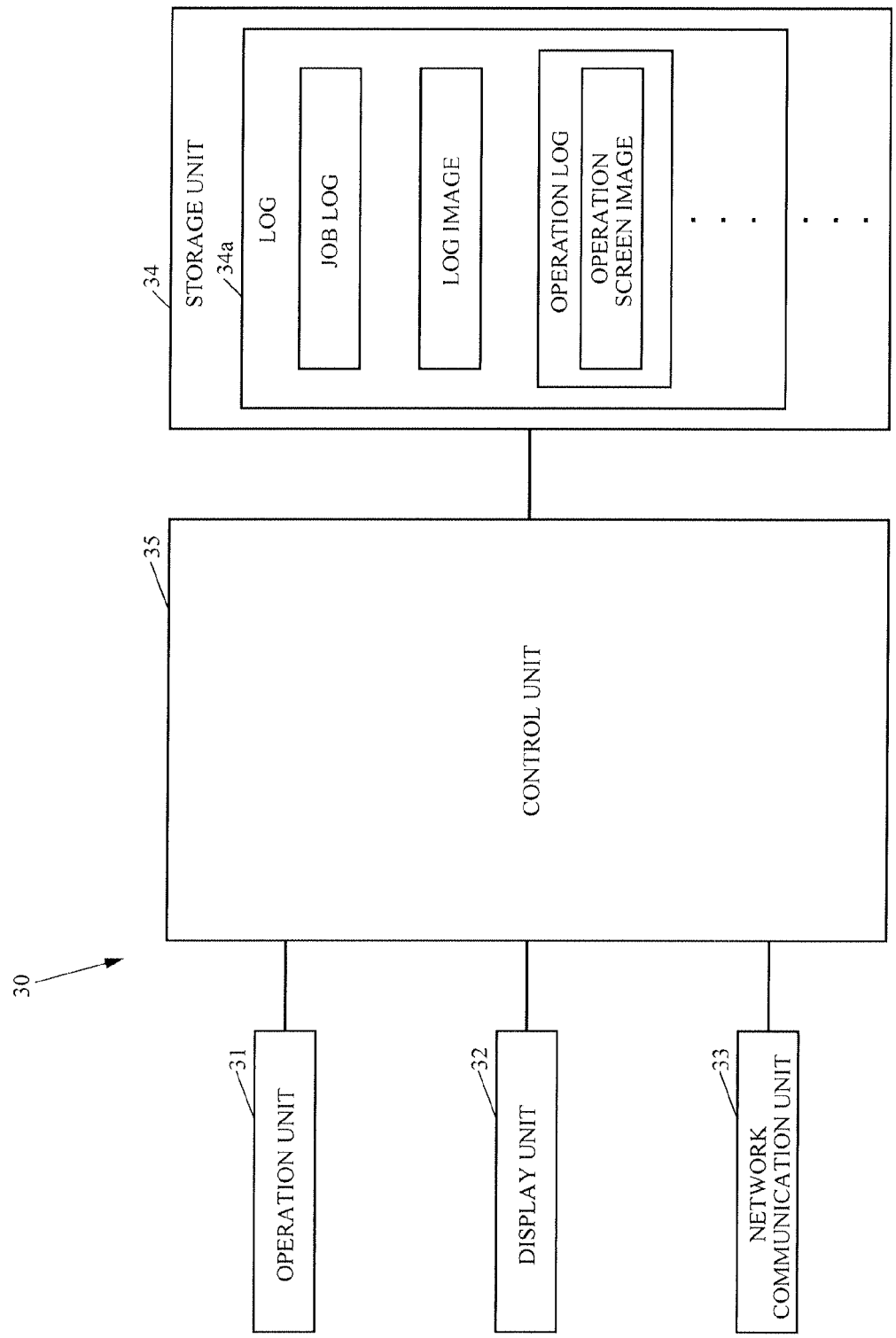
FIG. 5 illustrates a configuration of a management server in FIG. 1.

FIG. 5 illustrates the configuration of the management server 30 in FIG. 1.

As illustrated in FIG. 5, the management server 30 includes an operation unit 31, a display unit 32, a network communication unit 33, a storage unit 34, and a control unit 35. The operation unit 31 is an input device such as a mouse or a keyboard, through which various operations are input. The display unit 32 is a device such as an LCD that displays various kinds of information. The network communication unit 33 is a device that performs communication with an external apparatus through the network 11 (see FIG. 1). The storage unit 34 is a non-volatile storage apparatus such as an HDD and stores therein a program and various kinds of data. The control unit 35 is a processor that controls the entire management server 30.

The storage unit 34 is able to store therein a log 34a of the MFP 20 for each job. The configuration of the log 34a is the same as the configuration of the log 27c illustrated in FIG. 2.

Next, the operation of the image forming system 10 will be described.

First, the operation of the MFP 20 for generating the log 27c will be described.

Figure 6:
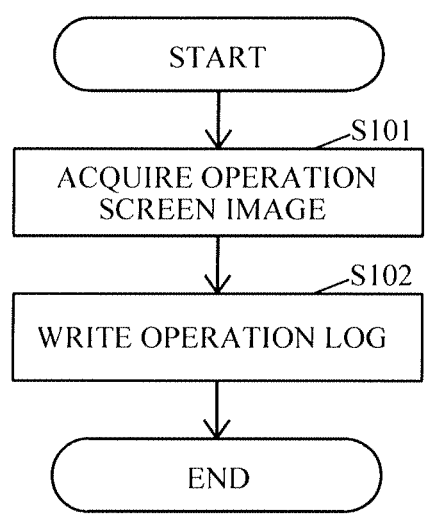
FIG. 6 illustrates an operation of the MFP in FIG. 2 when an operation is input to an operation unit.

The control unit 28 in the MFP 20 executes an operation illustrated in FIG. 6 every time an operation is input to the operation unit 21.

FIG. 6 illustrates the operation of the MFP 20 when an operation is input to the operation unit 21.

As illustrated in FIG. 6, by capturing the operation screen 22a when the operation unit 21 is operated, the operation screen image acquisition unit 28c in the control unit 28 acquires the operation screen image 27g (S101). In addition, the processing operation in S101 is executed at a timing when the control unit 28 does not execute processing for forming an output image.

Next, the log management unit 28a in the control unit 28 writes, into the storage unit 27, the operation log 27f corresponding to the operation input to the operation unit 21 (S102). Here, the log management unit 28a causes the operation screen image 27g acquired in S101 to be included in the operation log 27f.

After the processing operation in S102, the control unit 28 terminates the operation illustrated in FIG. 6.

In addition, if a setting in the MFP 20 such as grouping, double-sided, or a magnification ratio has been changed, the log management unit 28a writes, into the storage unit 27, an access log indicating a history of this change. The processing operation is executed at a timing when the control unit 28 does not execute processing for forming an output image.

Figure 7:
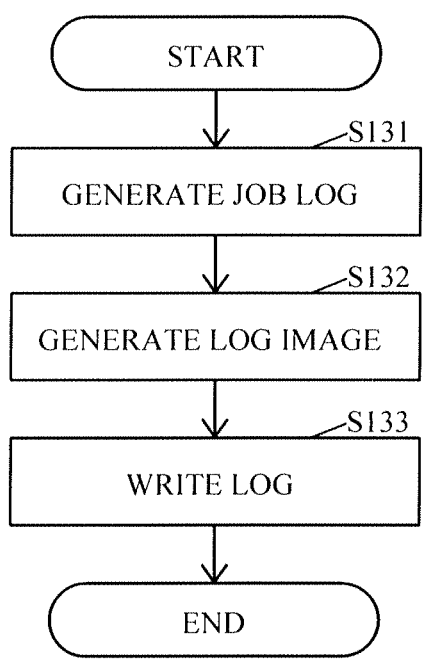
FIG. 7 illustrates an operation of the MFP in FIG. 2 when a job is executed.

The control unit 28 executes an operation illustrated in FIG. 7 every time a job is executed.

FIG. 7 illustrates an operation of the MFP 20 when a job is executed.

As illustrated in FIG. 7, the log management unit 28a generates the job log 27d of the executed job (hereinafter, referred to as a "target job") (S131). Here, from among access logs written into the storage unit 27, the log management unit 28a causes an access log relating to the target job to be included in the job log 27d.

Next, the log management unit 28a generates the log image 27e, based on an output image for the target job (S132).

Next, the log management unit 28a writes, into the storage unit 27 as the log 27c of the target job, the job log 27d generated in S131, the log image 27e generated in S132, and the operation log 27f corresponding to the operation input to the operation unit 21 for the target job. Then the log management unit 28a associates the job log 27d, the log image 27e, and the operation log 27f with one another (S133). The operation log 27f is selected from among the operation logs 27f written into the storage unit 27 in S102.

In addition, the log management unit 28a transmits the log 27c stored in the storage unit 27, to the management server 30 through the network communication unit 26 at a specific timing. If a log is received from the MFP 20 through the network communication unit 33, the control unit 35 in the management server 30 writes, as the log 34a, the received log into the storage unit 34.

Next, an operation of the MFP 20 for outputting the log 27c will be described.

In order to confirm the contents of the job log 27d and the log image 27e stored in the storage unit 27, an administrator is able to input an instruction for displaying the job log 27d and the log image 27e, to the MFP 20 through the operation unit 21.

Figure 8:
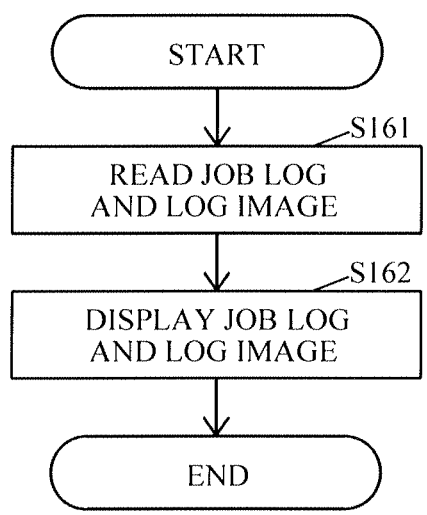
FIG. 8 illustrates an operation of the MFP in FIG. 2 for displaying a job log and a log image.

If the instruction for displaying the job log 27d and the log image 27e has been input, the control unit 28 in the MFP 20 executes an operation illustrated in FIG. 8.

FIG. 8 illustrates an operation of the MFP 20 for displaying the job log 27d and the log image 27e.

As illustrated in FIG. 8, the log management unit 28a in the control unit 28 reads the job log 27d and the log image 27e from the storage unit 27 (S161).

Next, the log management unit 28a causes the display unit 22 to display the job log 27d and the log image 27e read in S161 (S162), and terminates the operation illustrated in FIG. 8.

Accordingly, it is possible for the administrator to confirm the job log 27d and the log image 27e displayed in the display unit 22. Therefore, using the log image 27e, it is possible for the administrator to determine a probability that an information leak has occurred based on an image output by, for example, the MFP 20. In addition, using the job log 27d, it is possible for the administrator to determine a user outputting an image causing the information leak.

In addition, while, in the above description, the display of the job log 27d and the log image 27e in the display unit 22 has been described, an output method for the job log 27d and the log image 27e may be a method other than display. For example, by performing printing using the printer 24, it is possible for the MFP 20 to output the job log 27d and the log image 27e in response to an instruction through the operation unit 21.

Next, an operation of the MFP 20 for outputting an operation procedure journal will be described.

It is possible for the administrator to input, to the MFP 20 through the operation unit 21, an instruction for displaying an operation procedure journal illustrating the procedure of an operation relating to a job where, as the result of confirmation of the job log 27d and the log image 27e, a probability that an information leak has occurred based on an image output by the MFP 20 is determined to be high.

Figure 9:
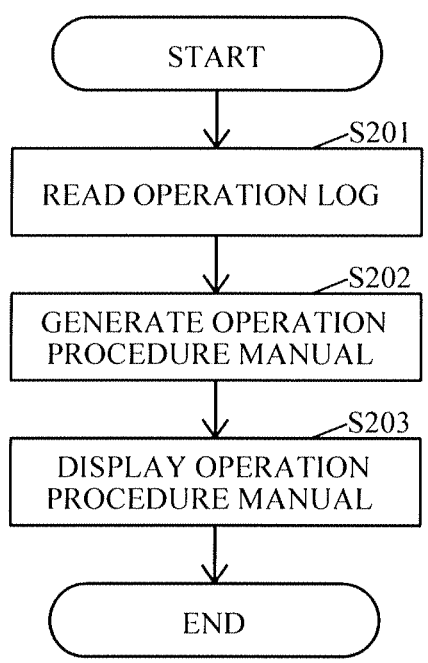
FIG. 9 illustrates an operation of the MFP in FIG. 2 for displaying an operation procedure journal.

If the instruction for displaying the operation procedure journal has been input, the control unit 28 in the MFP 20 executes an operation illustrated in FIG. 9.

FIG. 9 illustrates an operation of the MFP 20 for displaying the operation procedure journal.

As illustrated in FIG. 9, the operation state image generation unit 28b in the control unit 28 reads, from the storage unit 27, the operation log 27f of a job specified through the operation unit 21 (S201).

Next, the operation state image generation unit 28b generates the operation procedure journal, based on the operation log 27f read in S201 (S202).

Figure 10:
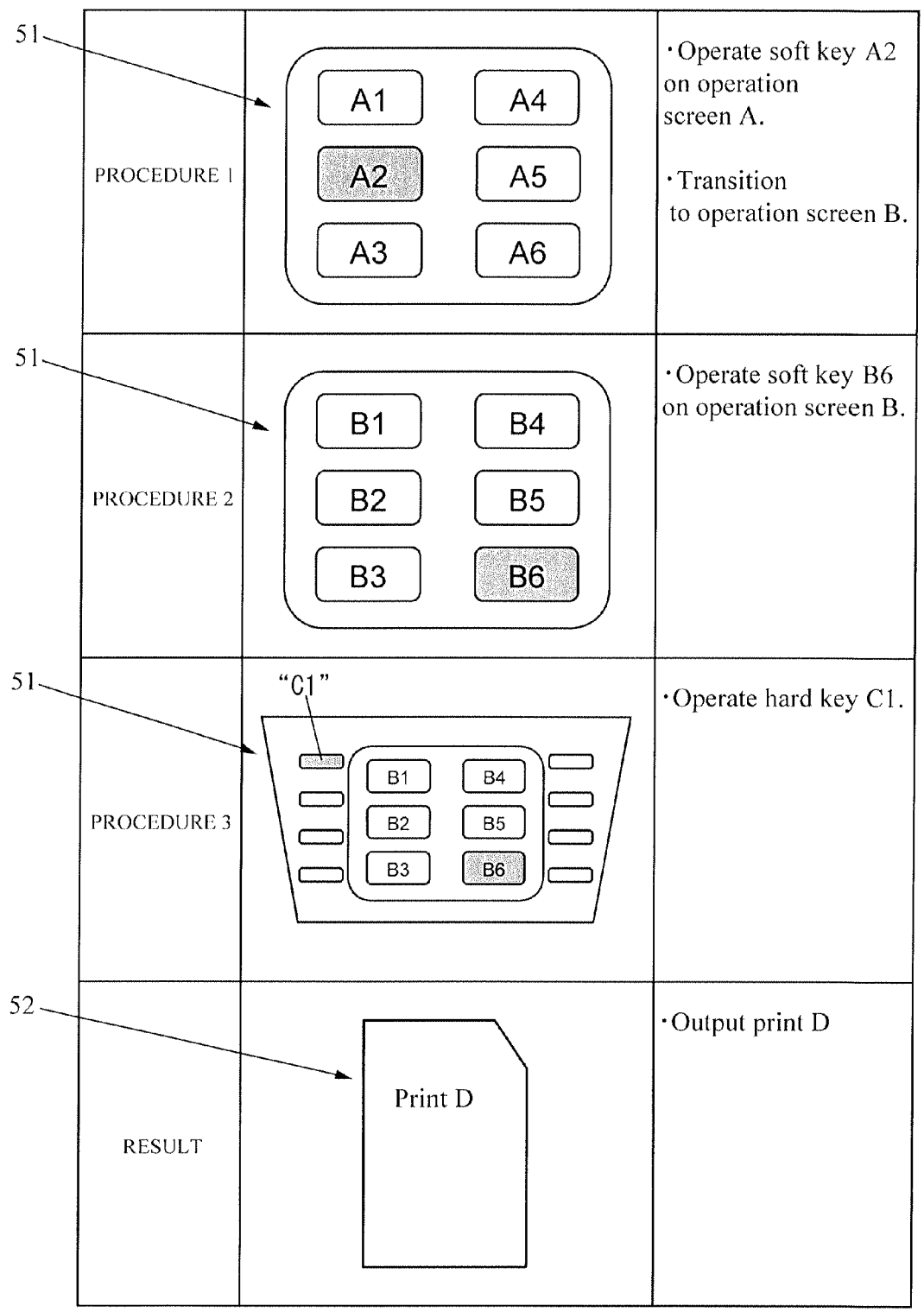
FIG. 10 illustrates an example of the operation procedure journal generated by the MFP in FIG. 2.

FIG. 10 illustrates an example of the operation procedure journal generated by the MFP 20.

A "PROCEDURE 1" field, a "PROCEDURE 2" field, and a "PROCEDURE 3" field illustrated in FIG. 10 each include an operation state image 51 indicating which operable item out of a plurality of operable items within the operation unit 21 is operated, based on an operation included in the operation log 27f.

The operation state image 51 in each of the "PROCEDURE 1" and "PROCEDURE 2" fields is the operation screen image 27g included in the operation log 27f.

The operation state image 51 in the "PROCEDURE 3" field is an image obtained by combining an image of the operation panel included in the operation-panel-related information 27b and the operation screen image 27g included in the operation log 27f. Characters, "C1", in the operation state image 51 in the "PROCEDURE 3" field are information based on character information included in the operation log 27f. Within the image of the operation panel included in the operation state image 51 in the "PROCEDURE 3" field, the operation state image generation unit 28b emphasizes the area of a hard key with which a name, "C1", is associated in the operation-panel-related information 27b, by, example for, coloring the area of a hard key with gray.

An image 52 included in a "RESULT" field is an image expressing the image of a printing result. An image printed on a recording medium in the image 52 may be a sample image and may be the log image 27e. In addition, the operation state image generation unit 28b generates the image 52 in which a setting recorded in an access log included in the job log 27d is reflected. For example, if the setting of "4 in 1" for aggregating input images corresponding to four pages into an output image corresponding to one page is recorded in an access log, the operation state image generation unit 28b generates the image 52 to which "4 in 1" is applied.

As illustrated in FIG. 9, after the processing operation in S202, the operation state image generation unit 28b causes the display unit 22 to display the operation procedure journal generated in S202 (S203), and terminates the processing operation illustrated in FIG. 9.

Accordingly, by confirming the operation procedure journal displayed in the display unit 22, it is possible for the administrator to recognize what operation performed on the MFP 20 results in the information leak.

In addition, while, in the above description, the display of the operation procedure journal in the display unit 22 has been described, an output method for the operation procedure journal may be a method other than display. For example, by performing printing using the printer 24, it is possible for the MFP 20 to output the operation procedure journal in response to an instruction through the operation unit 21.

As described above, it is possible for the image forming system 10 to generate the operation state image 51 indicating which operable item out of the plural operable items in the operation unit 21 in the MFP 20 is operated in an operation included in the operation log 27*f* (S202). Accordingly, using the operation state image 51, it is possible for the image forming system 10 to cause the administrator to intuitively recognize what operation performed on the MFP 20 results in the information leak.

For example, if, from among operations performed on the MFP 20, the administrator recognizes an operation resulting in the information leak, it is possible for the administrator to suppress the occurrence of the information leak after that, by keeping users of the MFP 20 informed about trying not to execute such an operation.

Based on the operation state images 51 corresponding to specific operations out of a sequence of operations for a job, it is possible for the image forming system 10 to generate the operation procedure journal (S202). Accordingly, it is possible for the image forming system 10 to easily generate the operation procedure journal used for explaining to users of the MFP 20 about an operation resulting in the information leak. From this, it is possible for the administrator to save the effort of creating a separate operation procedure journal single-handedly. The operation state image 51 is included in the operation procedure journal. Therefore, even if a user of the MFP 20 is unfamiliar with operations performed on the MFP 20, it is possible for the user of the MFP 20 to easily recognize an operation resulting in the information leak from among operations performed on the MFP 20, by confirming the operation procedure journal.

In addition, the image forming system 10 does not have to generate the operation procedure journal. In other words, if it is possible for the image forming system 10 to cause the administrator to confirm the operation state image 51, it is possible for the image forming system 10 to cause the administrator to easily recognize what operation performed on the MFP 20 results in the information leak.

It is possible for the image forming system 10 to cause the operation screen image 27*g* to be included in the operation state image 51, the operation screen image 27*g* serving as the image of an operation screen displayed in the display unit 22 in an operation included in the operation log 27*f*. Accordingly, using the operation state image 51, it is possible for the image forming system 10 to cause the administrator to intuitively recognize what operation performed on the MFP 20 results in the information leak.

In addition, the image forming system 10 may cause only the operation states of the hard keys 21*a* out of a plurality of operable items in the operation unit 21 to be included in the operation state image 51 without causing the operation screen image 27*g* to be included in the operation state image 51.

It is possible for the image forming system 10 to acquire the operation screen image 27*g* serving as the image of an operation screen actually displayed in the display unit 22 (S101) and manage the operation screen image 27*g* (S102). Accordingly, compared with a configuration where an operation screen is re-created later based on the character information of the operation log 27*f*, it is possible for the image forming system 10 to improve the accuracy of the operation state image 51.

In addition, the image forming system 10 may re-create the operation screen later based on the character information of the operation log 27*f*.

In the MFP 20, a range to be included in the operation state image 51 is able to be set based on an instruction through, for example, the operation unit 21. In other words, when generating the operation state image 51 indicating the states of the operations of the hard keys 21*a*, the MFP 20 may be set so as to cause the operation screen image 27*g* to be included in such a manner as the operation state image 51 in the "PROCEDURE 3" field illustrated in FIG. 10. In an opposite manner, when generating the operation state image 51 indicating the states of the operations of the hard keys 21*a*, the MFP 20 may be set so as not to cause the operation screen image 27*g* to be included in the operation state image 51. In addition, when generating the operation state image 51 indicating the states of the operations of the soft keys 21*b*, the MFP 20 may be set so as to cause only the operation screen image 27*g* to be included in the operation state image 51 in such a manner as the operation state image 51 in the "PROCEDURE 1" field or the "PROCEDURE 2" illustrated in FIG. 10. In an opposite manner, when generating the operation state image 51 indicating the states of the operations of the soft keys 21*b*, the MFP 20 may be set so as to cause the entire operation panel to be included in such a manner as the operation state image 51 in the "PROCEDURE 3" field illustrated in FIG. 10.

In addition, in the MFP 20, the type of operation screen for acquiring the operation screen image 27*g* in S101 is able to be set based on an instruction through, for example, the operation unit 21. For example, the MFP 20 may be set so as to acquire the operation screen image 27*g* of an operation screen for a job for copying and so as not to acquire the operation screen image 27*g* of an operation screen for a job for facsimile. Based on this setting, it is possible for the MFP 20 to suppress the number of the generated operation screen images 27*g*. Therefore, it is possible to suppress capacity used for storing the operation screen image 27*g*, within the capacity of the storage unit 27.

In addition, in the MFP 20, a timing when the operation screen image 27*g* is acquired in S101 is able to be set based on an instruction through, for example, the operation unit 21. For example, the MFP 20 may be set so that the operation screen image 27*g* from the operation of a start key to the execution of printing based on the printer 24 is acquired in the job for copying. Based on this setting, it is possible for the MFP 20 to suppress the number of the generated operation screen images 27*g*. Therefore, it is possible to suppress capacity used for storing the operation screen image 27*g*, to fall within the capacity of the storage unit 27.

When the form of an output of an image is to store an image into an external storage device such as a USB memory, in S101 the MFP 20 may acquire, as the operation screen image 27*g*, an operation screen displaying a hierarchical structure of a path of a storage destination. There is a possibility that the administrator is able to find out an owner of a storage device by reference to a feature of the hierarchical structure of a path included in the operation screen image 27*g*, such as, for example, the name of a folder.

In addition, in the image forming system 10, while it is possible for the MFP 20 to generate the operation state image 51 single-handedly, a portion of the above-mentioned function of the MFP 20 may be realized by the management server 30.

For example, the control unit 35 in the management server 30 may include one or more of a log management unit, an operation state image generation unit, and an operation screen image acquisition unit. In this case, the log management unit, the operation state image generation unit, and the operation screen image acquisition unit in the control unit 35 in the management server 30 may perform all or parts of the operations of the log management unit 28*a*, the operation state image generation unit 28b, and the operation screen image acquisition unit 28c in the MFP 20 in the above-mentioned embodiment, respectively.

In addition, while the image forming system 10 includes the MFP as the image forming apparatus of the present disclosure, the image forming system 10 may include an image forming apparatus other than the MFP, such as a printer-dedicated apparatus, a copy-dedicated apparatus, or a facsimile-dedicated apparatus.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming system comprising:
   a log management unit configured to manage each of the following:
      (a) a job log indicating a history of a job executed by an image forming apparatus,
      (b) a log image indicating a history of an output image serving as an output target of the image forming apparatus for the job, and
      (c) an operation log indicating a history of an operation input to an operation unit in the image forming apparatus for the job; and
   an operation state image generation unit configured to generate an operation state image indicating which of a plurality of operable items in the operation unit is operated in an operation included in the operation log,
   wherein the image forming apparatus further includes a display unit that displays an operation screen serving as an operation target of the operation unit, and
   wherein the operation state image generation unit causes an image of the operation screen displayed in the display unit in an operation included in the operation log to be included in the operation state image.

2. The image forming system according to claim 1, wherein the operation state image generation unit generates an operation procedure journal, based on at least one operation state image corresponding to a specific operation out of a sequence of operations for the job.

3. The image forming system according to claim 1, further comprising:
   an operation screen image acquisition unit configured to acquire the image of the operation screen when the operation unit is operated, wherein
   the log management unit causes the image of the operation screen acquired by the operation screen image acquisition unit to be included in the operation log.

4. The image forming system according to claim 1, wherein the image forming apparatus includes at least one of the log management unit and the image generation unit.

5. The image forming system according to claim 1, wherein a server connected to the image forming apparatus includes at least one of the log management unit and the image generation unit.

6. A log management method comprising:
   managing, via a log management unit, each of the following:
      (a) a job log indicating a history of a job executed by an image forming apparatus,
      (b) a log image indicating a history of an output image serving as an output target of the image forming apparatus for the job, and
      (c) an operation log indicating a history of an operation input to an operation unit in the image forming apparatus for the job;
   generating, via an operation state image generation unit, an operation state image indicating which of a plurality of operable items in the operation unit is operated in an operation included in the operation log;
   displaying, via a display unit in the image forming apparatus, an operation screen serving as an operation target of the operation unit; and
   causing, via the operation state image generation unit, an image of the operation screen displayed in the display unit in an operation included in the operation log to be included in the operation state image.

7. The log management method according to claim 6, further comprising:
   generating, via the operation state image generation unit, an operation procedure journal, based on at least one operation state image corresponding to a specific operation out of a sequence of operations for the job.

8. The log management method according to claim 6, further comprising:
   acquiring, via an operation screen image acquisition unit, the image of the operation screen when the operation unit is operated; and
   causing, via the log management unit, the image of the operation screen acquired by the operation screen image acquisition unit to be included in the operation log.

9. The log management method according to claim 6, wherein at least one of the managing via the log management unit and the generating via the operation state image generation unit is performed in the image forming apparatus.

10. The log management method according to claim 6, at least one of the managing via the log management unit and the generating via the operation state image generation unit is performed in a server connected to the image forming apparatus.

11. A non-transitory computer-readable recording medium storing a log management program executable by a computer in an image forming apparatus, the log management program comprising:
    a first program code causing the computer to manage each of the following:
       (a) a job log indicating a history of an executed job,
       (b) a log image indicating a history of an output image serving as an output target in the job, and
       (c) an operation log indicating a history of an operation input to an operation unit in the image forming apparatus for the job;
    a second program code causing the computer to generate an operation state image indicating which of a plurality of operable items is operated in an operation included in the operation log;
    a third program code causing the computer to display an operation screen serving as an operation target of the operation unit; and
    a fourth program code causing the computer to cause an image of the operation screen displayed in the display unit in an operation included in the operation log to be included in the operation state image.

12. The non-transitory computer-readable recording medium according to claim 11, the log management program further comprising:
    a fifth program code causing the computer to generate an operation procedure journal, based on at least one operation state image corresponding to a specific operation out of a sequence of operations for the job.

13. The non-transitory computer-readable recording medium according to claim 11, the log management program further comprising:
- a sixth program code causing the computer to acquire the image of the operation screen when the operation unit is operated; and
- a seventh program code causing the computer to cause the image of the operation screen acquired by the operation screen image acquisition unit to be included in the operation log.

14. An image forming system comprising:
- a log management unit configured to manage each of the following:
  - (a) a job log indicating a history of a job executed by an image forming apparatus,
  - (b) a log image indicating a history of an output image serving as an output target of the image forming apparatus for the job, and
  - (c) an operation log indicating a history of an operation input to an operation unit in the image forming apparatus for the job; and
- an operation state image generation unit configured to generate an operation state image indicating which of a plurality of operable items in the operation unit is operated in an operation included in the operation log,
- wherein the operation state image generation unit generates an operation procedure journal, based on at least one operation state image corresponding to a specific operation out of a sequence of operations for the job.

15. A log management method comprising:
- managing, via a log management unit, each of the following:
  - (a) a job log indicating a history of a job executed by an image forming apparatus,
  - (b) a log image indicating a history of an output image serving as an output target of the image forming apparatus for the job, and
  - (c) an operation log indicating a history of an operation input to an operation unit in the image forming apparatus for the job;
- generating, via an operation state image generation unit, an operation state image indicating which of a plurality of operable items in the operation unit is operated in an operation included in the operation log; and
- generating, via the operation state image generation unit, an operation procedure journal, based on at least one operation state image corresponding to a specific operation out of a sequence of operations for the job.

16. A non-transitory computer-readable recording medium storing a log management program executable by a computer in an image forming apparatus, the log management program comprising:
- a first program code causing the computer to manage each of the following:
  - (a) a job log indicating a history of an executed job,
  - (b) a log image indicating a history of an output image serving as an output target in the job, and
  - (c) an operation log indicating a history of an operation input to an operation unit in the image forming apparatus for the job;
- a second program code causing the computer to generate an operation state image indicating which of a plurality of operable items is operated in an operation included in the operation log; and
- a third program code causing the computer to generate an operation procedure journal, based on at least one operation state image corresponding to a specific operation out of a sequence of operations for the job.

* * * * *